US008990883B2

(12) United States Patent
Kapoor et al.

(10) Patent No.: US 8,990,883 B2
(45) Date of Patent: Mar. 24, 2015

(54) POLICY-BASED DEVELOPMENT AND RUNTIME CONTROL OF MOBILE APPLICATIONS

(71) Applicant: International Business Machines Corporation, Armonk, NY (US)

(72) Inventors: Shalini Kapoor, Karnataka (IN); Palanivel A. Kodeswaran, Bangalore (IN); Udayan Kumar, Gainsville, FL (US); Vikrant Nandakumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 13/732,729

(22) Filed: Jan. 2, 2013

(65) Prior Publication Data
US 2014/0189783 A1 Jul. 3, 2014

(51) Int. Cl.
*G06F 17/00* (2006.01)
*G06F 11/00* (2006.01)
*G06F 21/51* (2013.01)

(52) U.S. Cl.
CPC ..................................... *G06F 21/51* (2013.01)
USPC ................................................ 726/1; 726/22

(58) Field of Classification Search
CPC ......... G06F 21/00; G06F 21/10; G06F 21/12; G06F 21/121; G06F 21/30; G06F 21/44; G06F 21/45; G06F 21/50; G06F 21/51
USPC .................. 726/1, 22; 717/168, 170
See application file for complete search history.

(56) References Cited

U.S. PATENT DOCUMENTS

| | | | |
|---|---|---|---|
| 7,665,125 B2 | 2/2010 | Heard et al. | |
| 2001/0007133 A1* | 7/2001 | Moriconi et al. | 713/201 |
| 2004/0148514 A1* | 7/2004 | Fee et al. | 713/200 |
| 2004/0236760 A1* | 11/2004 | Arkeketa et al. | 707/100 |
| 2005/0008163 A1* | 1/2005 | Leser et al. | 380/281 |
| 2005/0055578 A1* | 3/2005 | Wright et al. | 713/201 |
| 2005/0097346 A1* | 5/2005 | Pipal et al. | 713/200 |

(Continued)

OTHER PUBLICATIONS

Kuntze et al., Secure mobile business information processing, 978-0-7695-4322-2/10, 2010 IEEE, DOI 10.1109/EUC.2010.107, pp. 672-678.

(Continued)

*Primary Examiner* — Darren B Schwartz
(74) *Attorney, Agent, or Firm* — Schmeiser, Olsen & Watts, LLP; John Pivnichny

(57) ABSTRACT

A method, process, and associated systems for policy-based development and runtime control of mobile applications. Security objects that describe or enforce security policies are embedded into the source code of an enhanced application while the application is being developed. When a user attempts to launch the enhanced application on a mobile device, the security objects are updated to match a latest valid version of the objects stored on an enterprise server. The security objects may be further updated at other times. Global security policies, which affect the entire enterprise and which may deny the application permission to launch, are enforced by a global security policy stored within one of the updated security objects. If the application does run, application-specific security policies contained in the updated security objects modify application behavior at runtime in order to enforce application-specific security policies.

19 Claims, 2 Drawing Sheets

(56) References Cited

U.S. PATENT DOCUMENTS

| | | |
|---|---|---|
| 2005/0172336 A1* | 8/2005 | Gatto et al. .................. 726/1 |
| 2006/0075462 A1* | 4/2006 | Golan et al. .................. 726/1 |
| 2006/0236363 A1 | 10/2006 | Heard et al. |
| 2007/0118558 A1* | 5/2007 | Kahandaliyanage ...... 707/104.1 |
| 2007/0143824 A1 | 6/2007 | Shahbazi |
| 2007/0266422 A1 | 11/2007 | Germano et al. |
| 2009/0049518 A1 | 2/2009 | Roman et al. |
| 2010/0064341 A1 | 3/2010 | Aldera |
| 2010/0268581 A1 | 10/2010 | Biancardini et al. |
| 2011/0047536 A1* | 2/2011 | Santos et al. .................. 717/170 |
| 2011/0131273 A1 | 6/2011 | Merissert-Coffinieres et al. |
| 2011/0167474 A1 | 7/2011 | Sinha et al. |
| 2013/0283344 A1* | 10/2013 | Krstic et al. .................. 726/1 |
| 2013/0298185 A1* | 11/2013 | Koneru et al. .................. 726/1 |
| 2014/0020046 A1* | 1/2014 | Heitzman .................. 726/1 |

OTHER PUBLICATIONS

Schwartz et al., 7 Ways to Toughen Enterprise Mobile Device Security, Jan. 21, 2012, http://www.informationweek.com/news/security/mobile/232601100, pp. 1-4.

Ahmed Saleh Rashad Alsum, Application-Specific Dynamic Policy Rules Framework for Mobile Execution Environments, Arab Academy for Science, Technology, and Maritime Transport, College of Computing and Information Technology Department of Computer Science, 2009, 85 pages.

* cited by examiner

POLICY-BASED DEVELOPMENT AND RUNTIME CONTROL OF MOBILE APPLICATIONS

The present invention relates to development and runtime control of software applications that run on mobile devices.

BACKGROUND

Security threats to mobile devices may overwhelm static security mechanisms by appearing suddenly and launching unexpected modes of attack. This problem requires an efficient and flexible way to enforce and update security policies on the fly.

BRIEF SUMMARY

A first embodiment of the present invention provides a method of policy-based development and runtime control of mobile applications that comprises:

a processor of a computer system receiving a request to launch an enhanced application, wherein the enhanced application comprises an application policy descriptor, wherein the application policy descriptor identifies a global policy and an API policy;

the processor ensuring that the application policy descriptor is current and valid;

the processor extracting the global policy from the application policy descriptor;

the processor concluding that the global policy permits the enhanced application to launch;

the processor launching the enhanced application;

the processor determining that the application implements the API policy;

the processor extracting the API policy from the application policy descriptor; and the processor enforcing the API policy.

A second embodiment of the present invention provides a computer program product, comprising a computer-readable hardware storage device having a computer-readable program code stored therein, said program code configured to be executed by a processor of a computer system to implement a method of policy-based development and runtime control of mobile applications that comprises:

the processor receiving a request to launch an enhanced application, wherein the enhanced application comprises an application policy descriptor, wherein the application policy descriptor identifies a global policy and an API policy;

the processor ensuring that the application policy descriptor is current and valid;

the processor extracting the global policy from the application policy descriptor;

the processor concluding that the global policy permits the enhanced application to launch;

the processor launching the enhanced application;

the processor determining that the application implements the API policy;

the processor extracting the API policy from the application policy descriptor; and the processor enforcing the API policy.

A third embodiment of the present invention provides a computer system comprising a processor, a memory coupled to said processor, and a computer-readable hardware storage device coupled to said processor, said storage device containing program code configured to be run by said processor via the memory to implement a method of policy-based development and runtime control of mobile applications that comprises:

the processor receiving a request to launch an enhanced application, wherein the enhanced application comprises an application policy descriptor, wherein the application policy descriptor identifies a global policy and an API policy;

the processor ensuring that the application policy descriptor is current and valid;

the processor extracting the global policy from the application policy descriptor;

the processor concluding that the global policy permits the enhanced application to launch;

the processor launching the enhanced application;

the processor determining that the application implements the API policy;

the processor extracting the API policy from the application policy descriptor; and the processor enforcing the API policy.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with said computer system is configured to implement a method of policy-based development and runtime control of mobile applications that comprises:

a processor of a computer system receiving a request to launch an enhanced application, wherein the enhanced application comprises an application policy descriptor, wherein the application policy descriptor identifies a global policy and an API policy;

the processor ensuring that the application policy descriptor is current and valid;

the processor extracting the global policy from the application policy descriptor;

the processor concluding that the global policy permits the enhanced application to launch;

the processor launching the enhanced application;

the processor determining that the application implements the API policy;

the processor extracting the API policy from the application policy descriptor; and the processor enforcing the API policy.

DETAILED DESCRIPTION

Figure 1:
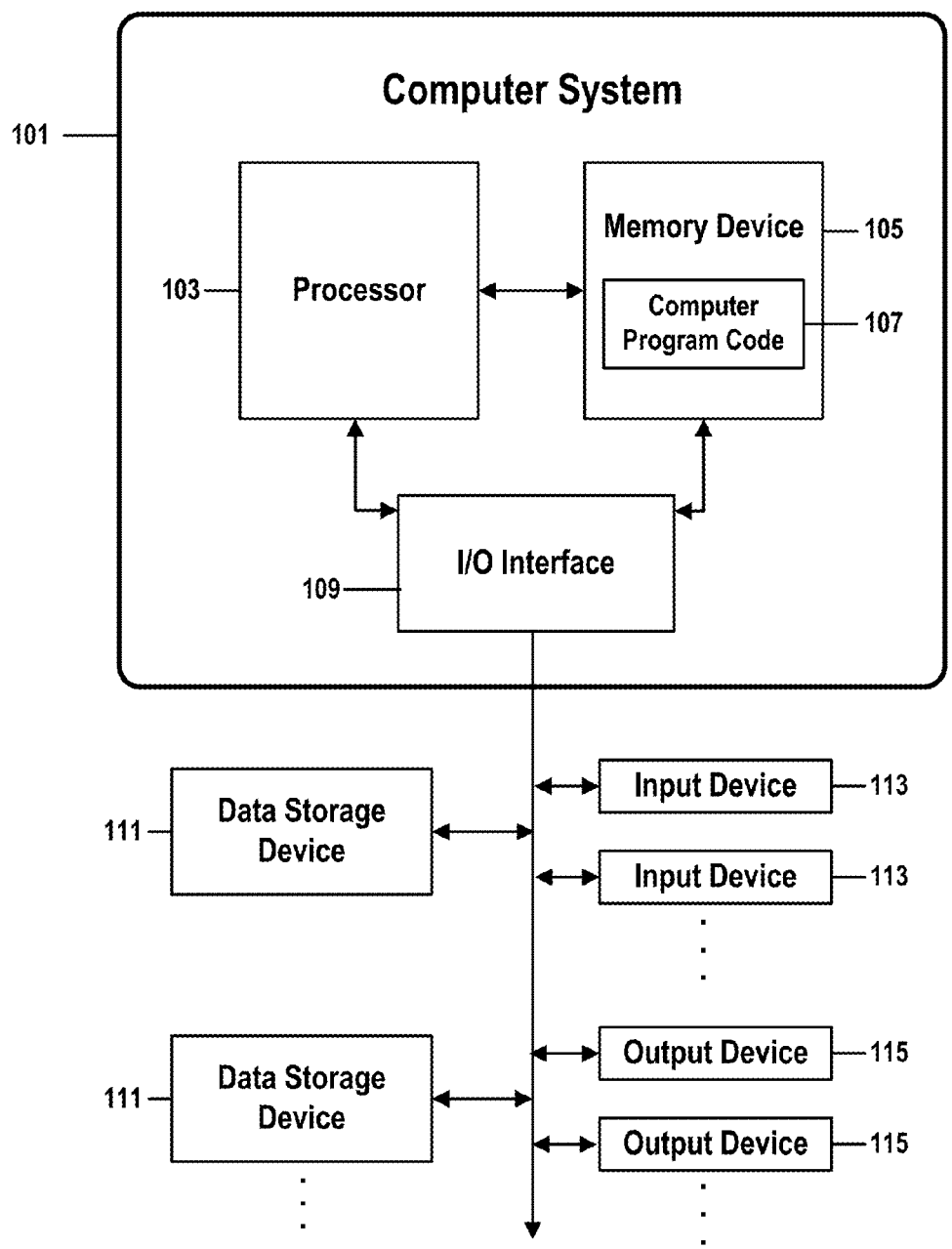
FIG. 1 shows a structure of a computer system and computer program code that may be used to implement a policy-based development and runtime control of mobile applications in accordance with embodiments of the present invention.

The present invention provides a method, a computer system, a computer program product, and a service for policy-based development and runtime control of mobile applications.

Software applications that run on mobile devices like smartphones, tablets, and notebook computers present unique security problems. Attackers may hide malware within legitimate applications and may develop new modes of attack with no warning. So-called "Zero Day Exploits" may allow malware to establish a foothold in mobile devices during the brief interval between the time when a new mode of attack occurs and the time when a defense can be deployed.

The present invention provides a method of policy-based application development that comprises the provisioning of security policies during application development, and wherein such "enhanced" applications comprise embedded security policy objects or security policy descriptors that may be updated dynamically from a remote location when the application is launched on a mobile device or updated by the application itself as part of its runtime functionality. In this way, the behavior of an enhanced application may be controlled by security policies at runtime and these policies may be automatically and remotely validated and updated both when the application is launched and at application runtime. In some embodiments, analogous methods may be used to provide policy-based development and runtime control of applications that run on nonmobile devices like fixed-location desktop computers that are hardwired into a computer network.

The method of the present invention presumes a preliminary step of defining complementary sets of global security policies and application programming interface ("API") security policies, and packaging those policies as policy "objects" or "descriptors". These objects, descriptors, or embodiments of the policies themselves, or references to these objects, descriptors, or policies, may be embedded into the source code of a mobile application.

Within this framework, a global policy may implement and ensure the consistency of security rules throughout an enterprise, wherein those rules determine whether a particular application may be executed under particular sets of conditions, wherein these conditions might be functions of a user's security status, detection of installed malware, or any other condition related to the system's design goals.

Under some conditions, a global policy may allow an application to run, but may impose constraints that may comprise, but are not limited to, restricting the application to only certain devices, classes of devices, users, users that have certain levels of authorization, communications infrastructures, geographic regions, times of day, or date ranges. Many other conditions and constraints are possible, and they may be functions of requirements that the security system is designed to satisfy. In some embodiments, a global policy may provide finer control, such as determining whether certain interface options are constrained or whether the application will be allowed to freely access certain information repositories.

The present invention may provide further granularity by implementing or provisioning application-specific API security policies. Such policies may be embedded into an enhanced application through API "method calls" or other types of computer instructions embedded into or referenced by the internal or external computer code that controls the behavior of the application. An API may comprise a library of functions that may be integrated into computer code and that may perform tasks like running a block of code that performs a common function or requesting a service from an operating system.

In the present invention, a security API might comprise functions that are stored in a library of computer-code modules designed to implement rules of security policies. Such a function might, for example, request or validate a set of user credentials, decode a data stream, authenticate a key, or detect that a data file is encrypted.

In such embodiments, an "enhanced" application might comprise API instructions that perform such functions while the application is running. The enhanced application could thus implement security policies that are specific to that particular application. Other types of code might further place the application in conformance with global security policies that are implemented throughout an enterprise.

Embodiments of the present invention thus allow security professionals to develop policy-compliant "enhanced" mobile applications, to implement both enterprise-wide global policies that are enforced when an enhanced application is launched and API-implemented application-specific policies that are enforced while an enhanced application is running, and to update both global and API policies on-the-fly by storing them on enterprise servers available to all mobile devices that are secured by such embodiments.

FIG. 1 shows a structure of a computer system and computer program code that may be used to implement a policy-based development and runtime control of mobile applications in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-2 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

Figure 2:
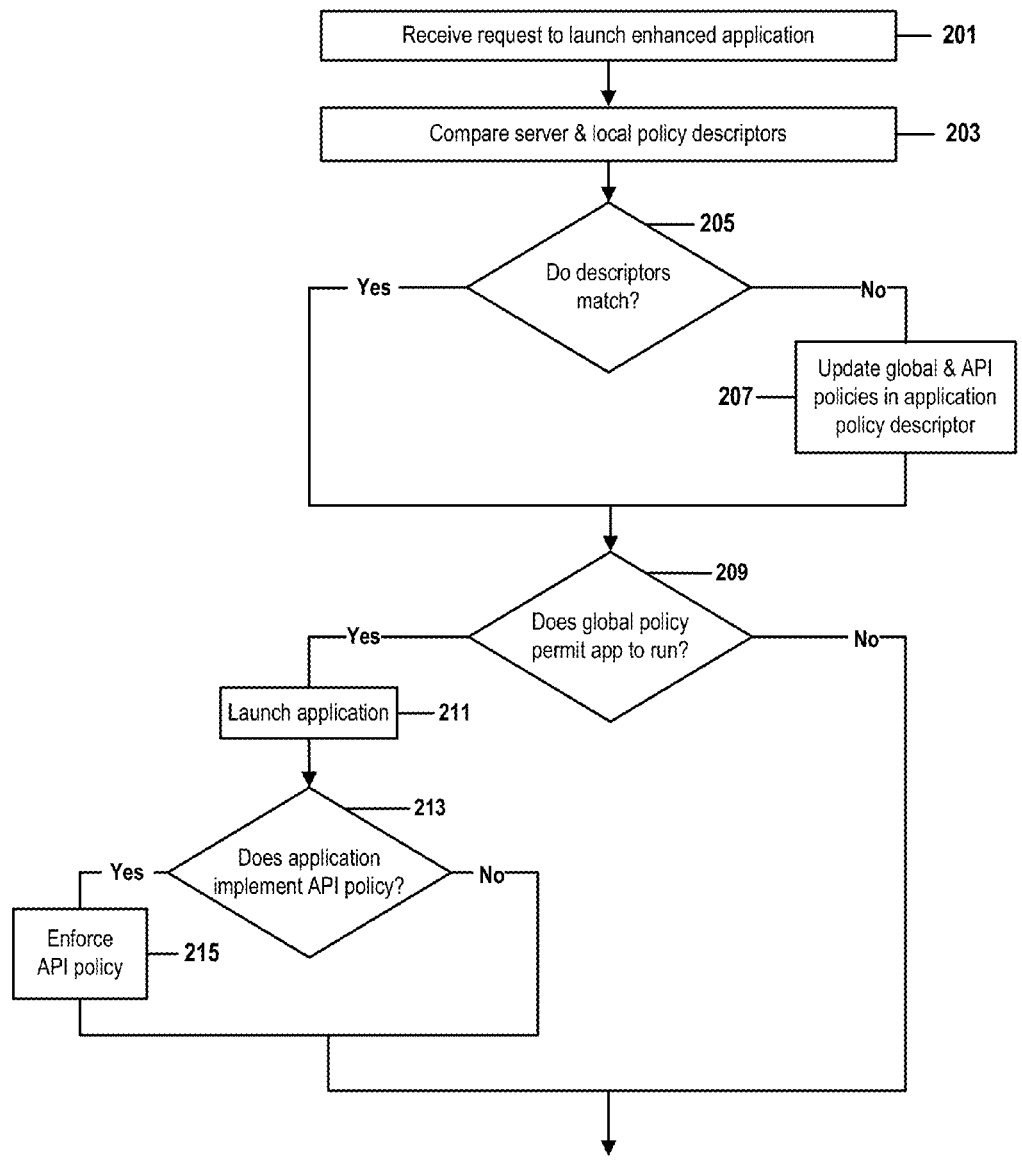
FIG. 2 is a flow chart that overviews a method for policy-based development and runtime control of mobile applications in accordance with embodiments of the present invention presented herein.

The flowchart illustrations and/or block diagrams FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for policy-based development and runtime control of mobile applications in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for policy-based development and runtime control of mobile applications.

Any of the components of the present invention could be created, integrated, hosted, maintained, deployed, managed, serviced, supported, etc. by a service provider who offers to facilitate a method for policy-based development and runtime control of mobile applications. Thus the present invention discloses a process for deploying or integrating computing infrastructure, comprising integrating computer-readable code into the computer system 101, wherein the code in combination with the computer system 101 is capable of performing a method for policy-based development and runtime control of mobile applications.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

FIG. 2 is a flow chart that overviews a method for policy-based development and runtime control of mobile applications in accordance with embodiments of the present invention presented herein. FIG. 2 comprises steps 201-215.

In step 201, a processor receives a request to launch an enhanced application, wherein the enhanced application may comprise or reference a global security policy, an API security policy, a descriptor that describes a global security policy, or a descriptor that describes an API security policy. Here, the processor identifies the requested application and may extract the security policies or descriptors comprised by the application without actually running the body of the application itself. In some embodiments, these security policies or descriptors may be logically linked to, and not embedded into, the enhanced application such that the processor responds to the launch request by identifying the linked policies or descriptors without accessing, loading, or launching any part of the application.

As described above, a global security policy is a policy that may provision security functionality throughout an enterprise infrastructure, such as a wireless network or a wired enterprise computer system. Similarly, an API security policy is a security policy that is implemented by computer code embedded within one or more enhanced applications and that may be specific to a single enhanced application, to a set of applications, or to all applications capable of running on devices connected to an enterprise infrastructure. An API security policy may be enforced at runtime by computer code embedded within one or more enhanced applications running on a mobile device connected to the enterprise infrastructure.

In some embodiments, an enhanced application may comprise or reference an application policy descriptor that describes or identifies a global policy that applies to the enhanced application, an API policy that is implemented or enforced by code embedded within the enhanced application, or both.

Step 203 begins a policy-update, or "ensuring," procedure that ensures that the policies or policy descriptors comprised or referenced by the enhanced application are valid and current. This procedure may comprise steps 203-207. In some embodiments, the ensuring procedure may be performed at other times in addition to, or instead of, being performed in response to receipt of a request to launch an enhanced application. These other times may occur at predetermined times or may occur in response to or as a function of an occurrence, nonoccurrence, existence, or nonexistence of a set of conditions.

In step 203, the processor requests and receives from an enterprise server the latest version of the policies or policy descriptors comprised or referenced by the enhanced application. In some embodiments, the processor may request a single application policy descriptor that comprises one or more global policies and one or more API policies, wherein versions of the one or more global policies and the one or more API policies are comprised or referenced by the enhanced application. The enterprise server may be any information repository or set of information repositories that store the latest valid versions of an enterprise's security policies or descriptors of security policies, so long as the repository is accessible to the mobile device.

Step 205 determines whether the policies or policy descriptors comprised or referenced by the enhanced application match the corresponding latest valid policies or policy descriptors received from the enterprise server in step 203. If it determines that they do match, then the method of FIG. 2 continues with step 209. If it determines that they do not match, then the method of FIG. 2 performs step 207 before it continues with step 209.

Step 207 is performed if step 205 determines that the policies or policy descriptors comprised or referenced by the enhanced application match the corresponding policies or policy descriptors received from the enterprise server in step 203. Step 207 may then update the policies, policy descriptors, or references comprised or referenced by the enhanced application by replacing all or part of those policies, policy descriptors, or references with all or part of corresponding latest valid versions of the policies, policy descriptors, or references received from the enterprise server in step 203.

In embodiments wherein the enhanced application comprises only a reference to an externally stored policy or policies descriptors, step 207 may upgrade all or part of the externally stored policies or policy descriptors by replacing all or part of them with all or part of the corresponding latest valid versions of the corresponding policies or policy descriptors received from the enterprise server in step 203.

Step 209 determines whether the updated global policies or descriptors comprised or referenced by the enhanced application permit the enhanced application to be launched. If it determines that the updated global policy or policies do permit the enhanced application to be launched, then the method of FIG. 2 continues with steps 211-215. If it determines that they do not permit the enhanced application to be launched, then the method of FIG. 2 terminates and the enhanced application is not allowed to run.

In some embodiments, a policy agent software embedded within the enhanced application may handle all or part of the tasks comprised by steps 201-209, which may comprise steps such as requesting and receiving latest valid policy versions from the enterprise server, determining whether the latest valid versions match the locally stored policy versions, or updating the locally stored policy versions.

In some embodiments, the updated global policy or policies comprised or referenced by the enhanced application may not bar the enhanced application from being launched, but they may constrain the application in an other way, such as limiting its ability to access certain types of data, perform certain functions, or implement certain settings.

Step 211 launches the enhanced application if step 209 determines that the updated global policy or policies comprised or referenced by the enhanced application permit the enhanced application to be launched.

Step 213 determines whether the launched enhanced application, as configured and run, implements one or more of the updated API policies comprised or referenced by the application. If it does implement one or more of the updated API policies, then step 215 is performed. If it does not implement one or more of the updated API policies, then step 215 is not performed and the method of FIG. 2 terminates at the conclusion of execution of the enhanced application.

In some embodiments, wherein the enhanced application must implement more than one updated API policy or must implement an updated API policy more than one time, steps 213 and 215 may be performed for each such implementation.

If Step 213 determines that the enhanced application implements one or more of the updated API policies, step 215 will enforce the API policy to be implemented. An API policy may comprise any security or other API-related function embedded into the enhanced application and that is programmed to be performed at application runtime. Examples of such a function comprise, but are not limited to: erasing data from a mobile device; securing data on a mobile device through encryption, access control, or other security mechanisms; restricting functionality of the enhanced application; or prompting a user for security credentials. Many other examples are possible, based on the requirements of the embodiment.

In an example that illustrates an embodiment of the method of FIG. 2, consider a business wherein all or part of the business's employees use personal or business-owned smartphones, tablets, and notebook computers that communicate through wireless or cellular connections to the business's enterprise infrastructure. In other examples, users may employ other types of mobile or portable devices that communicate with the infrastructure or access business assets or servers through different communications mechanisms.

In an embodiment of the present invention, the business may require certain employees to use a reporting application that must access both secured and unsecured data that resides on business-owned servers. This application may run on the mobile or portable devices described above and may download reports or other data to these mobile or portable devices.

Embodiments of the present invention allow this mobile reporting application to be secured through an integrated development and runtime framework that provisions and enforces security policies by defining global and application-specific security policies that control user and application behavior across the enterprise, by embedding policies into enhanced applications in order to control the runtime behavior of those applications, and by allowing those policies to be dynamically updated when an application is launched, at application runtime, and at other times as dictated by business requirements.

In these embodiments, developers "enhance" the mobile reporting application by embedding security instructions into the application's source code, wherein these instructions may comprise functions called by a security application program interface (API), and wherein these instructions instruct the application to enforce terms of a security policy that is specific to the application.

In these embodiments, the business may also embed computer code that provisions one or more global security policies that manage, in general terms, the behavior of all or a subset of applications running on mobile devices that interface with the business's communications infrastructure. Latest valid versions of both application-specific and global polices may be maintained on an enterprise server that is accessible throughout the enterprise.

In this example, the instructions that implement the application-specific "API" security policies and the instructions that implement the "global" security policies applicable to the reporting application are combined in an application policy descriptor that is embedded within the application. In other examples, an application may comprise multiple such application policy descriptors and each descriptor may contain instructions that implement multiple application-specific security policies or multiple global security policies. In other embodiments, a descriptor may not contain actual policy-implementing code, but may instead contain a reference to such code embedded within the application or stored in another application, on another computer system, or on a storage device. In all embodiments, the enterprise server will normally comprise, refer to, or link to the latest valid versions of any such global or application-specific policies, policy descriptors, or references.

In this ongoing example, a user of a mobile device may attempt to launch a copy of the enhanced reporting application, wherein the copy resides on the mobile device, and wherein the mobile device is capable of communicating with the business's communications infrastructure.

Upon identifying this launch request, the mobile device identifies the requested application and then determines which global and API security policies are associated with the requested application. This determining may be done by identifying policies, policy descriptors, or references that are embedded within the application or by identifying associated policies, policy descriptors, or references through an external mechanism, such as a lookup table stored on the mobile device or at other locations accessible through the business's communications infrastructure.

The processor then locates the one or more enterprise servers that store the latest valid versions of the associated policies, descriptors, or references. In some embodiments, the enterprise servers need not be computer systems, but may comprise any type of storage device or information repository that is accessible to the mobile device.

The processor identifies the latest valid versions of the associated policies, descriptors, or references and compares them to those it extracted or referenced from the copy of the enhanced application locally stored on the mobile device. If the locally stored mobile-device copies differ from the latest valid versions, the processor updates the local versions to match the latest valid versions.

In this example, the mobile device extracts an application policy descriptor from the enhanced reporting application, wherein the application policy descriptor comprises locally stored copies of a global security policy and two API security policies. Here, the device identifies these three locally stored policies and uses that information to look up the address of a corresponding enterprise server by referring to entries of a lookup table stored on a communications server attached to the business's communications infrastructure and accessible to the mobile device.

The mobile device then requests and downloads a latest valid version of the locally stored application policy descriptor and compares this downloaded descriptor to the locally stored descriptor. Here, it finds that the global security policy and one of the API security policies comprised by the locally stored descriptor match their corresponding policies in the downloaded latest valid descriptor, but the second locally stored API security policy does not match its corresponding policy in the latest valid descriptor. In response, the processor updates the locally stored application policy descriptor by replacing the nonmatching second locally stored API policy with its corresponding downloaded second API policy.

The processor may then replace the locally stored copy of the application policy descriptor with this updated version, but even if it does not, the processor will use only the updated version of the application policy descriptor throughout the remaining steps of this example.

The processor next identifies the rules implemented by the updated version of the global policy embedded within the updated version of the application policy descriptor. These rules may deny the application permission to be launched, based on one or more conditions. If, for example, the mobile device has been reported stolen, the processor may identify this fact through a lookup in a stolen-devices list and, in response to finding the device on the list, deny the application permission to run. In that case, the method of FIG. 2 might then terminate.

Global policies may be characterized as implementing across-the-board security policies that are not specific to a particular application. In some embodiments a global policy may perform standard application-independent functions other than denying applications permission to run in the presence of a certain condition. Here, the updated global policy might require additional actions to be taken. If, for example, the processor identifies the mobile device as being stolen, the policy might, in addition to denying the application permission to run, instruct the mobile phone to erase all its stored data, start transmit a location-tracking signal, or configure itself to stop working.

If the global policy allows the application to run normally, the phone launches the application. In this example, the application comprises code that implements or enforces two application-specific "API" security policies that are embedded, directly or by reference, into the application itself. These policies were updated, as described above, when the application was launched, may also be updated at other times, and may themselves specify that they be further updated at application runtime.

In this example, the first API security policy might request that the mobile phone user enter a security code before allowing the application to query a database of secured data; and the second, updated, API might transparently check a self-identified user's credentials against a constantly updated list of device-ownership data to verify that the self-identified user is authorized to run the reporting application on the mobile device. If either determination fails to verify that the user has authority to perform a specific action, the application, as controlled at runtime by the authenticated API security policy implemented within the application, would take steps to deny the user the ability to perform the action or otherwise enforce the appropriate application-specific API security policy.

These examples and FIGS. 1-2 describe embodiments of the present invention for purposes of illustration, but many modifications and changes should be apparent to those skilled in the art. Steps of the methods described herein may be performed in different order or may vary in minor ways. Accordingly, the appended claims are intended to encompass all such modifications and changes as fall within the true spirit and scope of this invention.

What is claimed is:

1. A method of policy-based development and runtime control of mobile applications that comprises:
a processor of a computer system receiving a request to launch an enhanced application, wherein the enhanced application comprises an application policy descriptor, wherein the application policy descriptor describes a global policy and an API policy;
the processor requesting a latest valid policy descriptor from an enterprise server, wherein the latest valid policy descriptor identifies a latest valid global policy and a latest valid API policy;
the processor determining whether the latest valid policy descriptor is identical to the application policy descriptor;
the processor confirming, as a function of the determining, that the latest valid policy descriptor does not match the application policy descriptor;
the processor modifying the application policy descriptor to match the latest valid policy descriptor, wherein the modifying comprises replacing the application policy descriptor with an updated application policy descriptor that identifies the latest valid global policy and the latest valid API policy, wherein the latest valid global policy identifies whether the enhanced application is allowed to launch when a predefined set of conditions exist, wherein the latest valid API policy identifies a security-related function that is performed by the enhanced application whenever the enhanced application is run, and wherein the latest valid API policy is implemented by code embedded into the enhanced application
the processor concluding that the latest valid global policy permits the enhanced application to launch;
the processor launching the enhanced application;
the processor enforcing the API policy by running code embedded into the enhanced application.

2. The method of claim 1, wherein the security-related function comprises erasing data from a mobile device.

3. The method of claim 2, wherein the modifying comprises:
the processor replacing the global policy with the latest valid global policy; and
the processor replacing the API policy with the latest valid API policy.

4. The method of claim 1, wherein the enforcing the API policy is selected from a group comprising:
erasing data from a mobile device;
securing data on a mobile device through encryption, access control, or other security mechanism;
restricting operations of the enhanced application at runtime;
prompting a user for security credentials; and
terminating the enhanced application;
and wherein the restricting is selected from a group comprising:
requiring a user to submit a set of security credentials;
authenticating a set of security credentials submitted in response to the requiring;
denying the enhanced application access to data; and
encrypting data that is processed by the enhanced application.

5. The method of claim 1, further comprising:
the processor ensuring that the application policy descriptor is current and valid, wherein the ensuring is performed at a time that is not a function of the launching of the enhanced application.

6. The method of claim 1, wherein the method further comprises:
the processor updating the latest valid policy descriptor stored on the enterprise server.

7. A computer program product, comprising a computer-readable hardware storage device having a computer-readable program code stored therein, said program code configured to be executed by a processor of a computer system to implement a method of policy-based development and runtime control of mobile applications that comprises:
the processor receiving a request to launch an enhanced application, wherein the enhanced application comprises an application policy descriptor, wherein the application policy descriptor describes a global policy and an API policy;
the processor requesting a latest valid policy descriptor from an enterprise server, wherein the latest valid policy descriptor identifies a latest valid global policy and a latest valid API policy;
the processor determining whether the latest valid policy descriptor is identical to the application policy descriptor;

the processor confirming, as a function of the determining, that the latest valid policy descriptor does not match the application policy descriptor;

the processor modifying the application policy descriptor to match the latest valid policy descriptor, wherein the modifying comprises replacing the application policy descriptor with an updated application policy descriptor that identifies the latest valid global policy and the latest valid API policy, wherein the latest valid global policy identifies whether the enhanced application is allowed to launch when a predefined set of conditions exist, wherein the latest valid API policy identifies a security-related function that is performed by the enhanced application whenever the enhanced application is run, and wherein the latest valid API policy is implemented by code embedded into the enhanced application the processor concluding that the latest valid global policy permits the enhanced application to launch;

the processor launching the enhanced application;

the processor enforcing the API policy by running code embedded into the enhanced application.

8. The program product of claim 7, wherein the security-related function comprises erasing data from a mobile device.

9. The program product of claim 8, wherein the modifying comprises:

the processor replacing the global policy with the latest valid global policy; and the processor replacing the API policy with the latest valid API policy.

10. The program product of claim 7, wherein the enforcing the API policy is selected from a group comprising:

erasing data from a mobile device;

securing data on a mobile device through encryption, access control, or other security mechanism;

restricting operations of the enhanced application at runtime;

prompting a user for security credentials; and terminating the enhanced application;

and wherein the restricting is selected from a group comprising:

requiring a user to submit a set of security credentials;

authenticating a set of security credentials submitted in response to the requiring;

denying the enhanced application access to data; and encrypting data that is processed by the enhanced application.

11. The program product of claim 7, further comprising:

the processor ensuring that the application policy descriptor is current and valid, wherein the ensuring is performed at a time that is not a function of the launching of the enhanced application.

12. The program product of claim 7, wherein the method further comprises:

the processor updating the latest valid policy descriptor stored on the enterprise server.

13. A computer system comprising a processor, a memory coupled to said processor, and a computer-readable hardware storage device coupled to said processor, said storage device containing program code configured to be run by said processor via the memory to implement a method of policy-based development and runtime control of mobile applications that comprises:

the processor receiving a request to launch an enhanced application, wherein the enhanced application comprises an application policy descriptor, wherein the application policy descriptor describes a global policy and an API policy;

the processor requesting a latest valid policy descriptor from an enterprise server, wherein the latest valid policy descriptor identifies a latest valid global policy and a latest valid API policy;

the processor determining whether the latest valid policy descriptor is identical to the application policy descriptor;

the processor confirming, as a function of the determining, that the latest valid policy descriptor does not match the application policy descriptor;

the processor modifying the application policy descriptor to match the latest valid policy descriptor, wherein the modifying comprises replacing the application policy descriptor with an updated application policy descriptor that identifies the latest valid global policy and the latest valid API policy, wherein the latest valid global policy identifies whether the enhanced application is allowed to launch when a predefined set of conditions exist, wherein the latest valid API policy identifies a security-related function that is performed by the enhanced application whenever the enhanced application is run, and wherein the latest valid API policy is implemented by code embedded into the enhanced application the processor concluding that the latest valid global policy permits the enhanced application to launch;

the processor launching the enhanced application;

the processor enforcing the API policy by running code embedded into the enhanced application.

14. The system of claim 13, wherein the security-related function comprises erasing data from a mobile device.

15. The system of claim 14, wherein the modifying comprises:

the processor replacing the global policy with the latest valid global policy; and the processor replacing the API policy with the latest valid API policy.

16. The system of claim 13, wherein the enforcing the API policy is selected from a group comprising:

erasing data from a mobile device;

securing data on a mobile device through encryption, access control, or other security mechanism;

restricting operations of the enhanced application at runtime;

prompting a user for security credentials; and terminating the enhanced application;

and wherein the restricting is selected from a group comprising:

requiring a user to submit a set of security credentials;

authenticating a set of security credentials submitted in response to the requiring;

denying the enhanced application access to data; and encrypting data that is processed by the enhanced application.

17. The system of claim 13, further comprising:

the processor ensuring that the application policy descriptor is current and valid, wherein the ensuring is performed at a time that is not a function of the launching of the enhanced application.

18. The system of claim 13, wherein the method further comprises:

the processor updating the latest valid policy descriptor stored on the enterprise server.

19. A process for supporting computer infrastructure, said process comprising providing at least one support service for at least one of creating, integrating, hosting, maintaining, and deploying computer-readable program code in a computer system, wherein the program code in combination with said computer system is configured to implement a method of policy-based development and runtime control of mobile applications that comprises:

- a processor of a computer system receiving a request to launch an enhanced application, wherein the enhanced application comprises an application policy descriptor, wherein the application policy descriptor describes a global policy and an API policy;
- the processor requesting a latest valid policy descriptor from an enterprise server, wherein the latest valid policy descriptor identifies a latest valid global policy and a latest valid API policy;
- the processor determining whether the latest valid policy descriptor is identical to the application policy descriptor;
- the processor confirming, as a function of the determining, that the latest valid policy descriptor does not match the application policy descriptor;
- the processor modifying the application policy descriptor to match the latest valid policy descriptor, wherein the modifying comprises replacing the application policy descriptor with an updated application policy descriptor that identifies the latest valid global policy and the latest valid API policy, wherein the latest valid global policy identifies whether the enhanced application is allowed to launch when a predefined set of conditions exist, wherein the latest valid API policy identifies a security-related function that is performed by the enhanced application whenever the enhanced application is run, and wherein the latest valid API policy is implemented by code embedded into the enhanced application
- the processor concluding that the latest valid global policy permits the enhanced application to launch;
- the processor launching the enhanced application; and
- the processor enforcing the API policy by running code embedded into the enhanced application.

* * * * *